United States Patent [19]

Tamamura

[11] Patent Number: 4,697,897
[45] Date of Patent: Oct. 6, 1987

[54] WATERTIGHT CAMERA

[75] Inventor: Hideo Tamamura, Tokyo, Japan

[73] Assignee: Canon Kabushiki Kaisha

[21] Appl. No.: 861,109

[22] Filed: May 6, 1986

Related U.S. Application Data

[63] Continuation of Ser. No. 644,536, Aug. 27, 1984, abandoned.

[30] Foreign Application Priority Data

Aug. 30, 1983 [JP] Japan ............................ 58-133960[U]
Sep. 14, 1983 [JP] Japan ................................ 58-170008

[51] Int. Cl.$^4$ ...................... G03B 17/08; G03B 15/03; G03B 13/14
[52] U.S. Cl. .................. 354/64; 354/149.11; 354/221
[58] Field of Search ............ 354/64, 221, 126, 149.11

[56] References Cited

U.S. PATENT DOCUMENTS 2,482,628  9/1949  Little ................................... 354/221
4,074,287  2/1978  Iwata et al. ................. 354/149.11 X
4,350,420  9/1982  Engelsmann et al. ..... 354/149.11 X

FOREIGN PATENT DOCUMENTS 186739  11/1982  Japan .................................... 354/64

*Primary Examiner*—W. B. Perkey
*Attorney, Agent, or Firm*—Toren, McGeady & Associates

[57] ABSTRACT

A watertight camera is disclosed in which the normal line of a transparent protection plate for an objective of the finder, or the normal line of a protector for the strobe, is inclined toward the axial direction of the photographic lens. While there is no interference during in-the-air photography, underwater photography is carried out more advantageously.

7 Claims, 8 Drawing Figures

WATERTIGHT CAMERA

This is a continuation of application Ser. No. 644,536, filed Aug. 27, 1984, now abandoned.

BACKGROUND OF THE INVENTION

1. Field of the Invention

This invention relates to watertight cameras for underwater photography.

2. Description of the Prior Art

Conventional watertight cameras have their finders and transparent protectors for their finders oriented so that the optical axis of the finder is parallel to the optical axis of the photographic objective, or intersects the latter at infinity. Though its parallax is not very appreciable for ordinary in-the-air photographic situations, this finder arrangement cannot be applied to underwater photography without problems. Because an object to be photographed underwater often lies at a relatively short distance of about 1 meter, a large parallax between the optical axes of the finder and the objective appears. Accordingly, when the photographer relies on the finder in placing an image of the object at the center of the viewfield, the photograph actually taken will be found to have the object image at or near one of the corners of the picture format.

An attempt has been made to overcome this drawback by inclining the optical axis of the finder to intersect that of the photographic lens at a distance of about 3 meters. This method relieves the problem to some extent, but does not perfectly improve the system.

The strobe built in watertight cameras has its reflector and protector pointing toward the object to be photographed in parallel with the optical axis of the objective. There is no problem in using this flash illumination for in-the-air photography. With underwater photography for an object at a relatively short distance (of about 1.5 meters), because the center axis of the path of rays from the strobe is deviated considerably from the axis of the strobe, only a marginal portion of the path of flash light rays is useable, causing flash illumination on the object to be insufficient or uneven. Therefore, underexposed photographs will be taken, and the right and left hand margins of the picture frame will differ greatly in exposure from each other.

SUMMARY OF THE INVENTION

An object of the present invention is to eliminate the above-described drawbacks and to provide a watertight camera having a transparent plate for protecting an objective lens of the finder, the transparent plate being inclined towards the optical axis of the photographic objective so that, without causing any interference during in-the-air photography, nevertheless when put under water, the optical axis of the finder is brought to intersect the optical axis of the photographic lens at a shorter object distance, thereby insuring that no parallax is introduced into the object image of the finder.

Another object of the present invention is to provide a watertight camera having a strobe incorporated therein with a protector for the strobe inclined so that the normal line of the protector intersects the optical axis of the photographic objective, thereby improving the light distribution characteristic not only in the air but also under water.

Other objects of the invention will become apparent from the following description of embodiments thereof.

DESCRIPTION OF THE PREFERRED EMBODIMENTS

Figure 1:
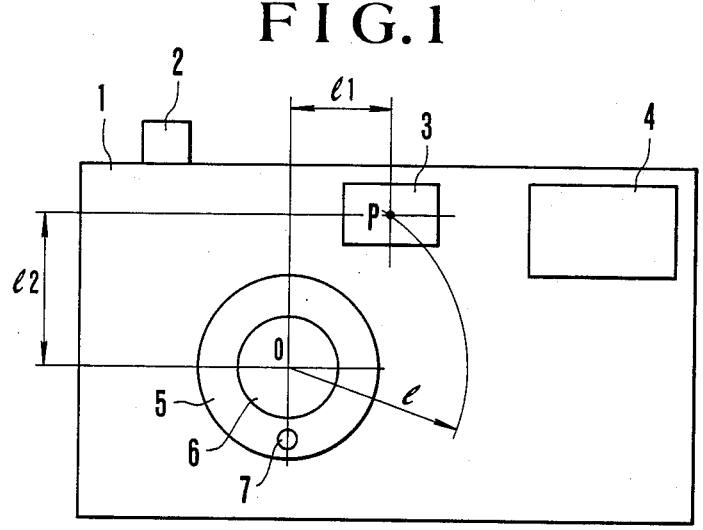
FIG. 1 is a front elevational view of a first embodiment of the watertight camera according to the present invention.
Figure 2:
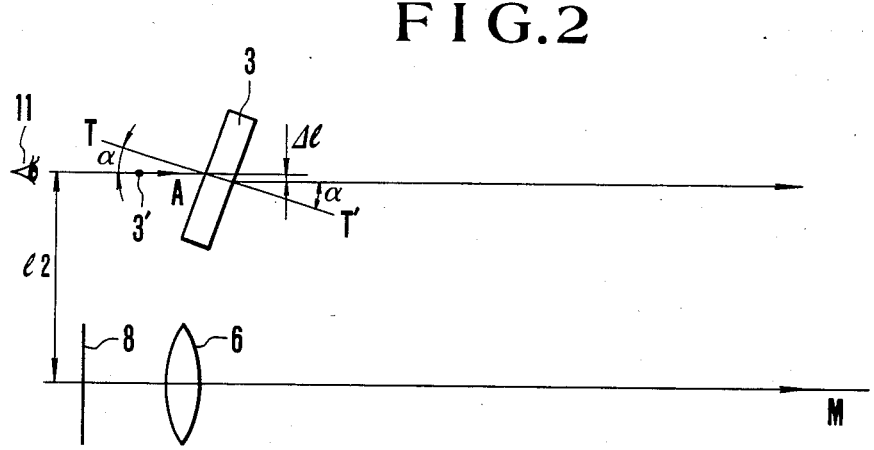
FIG. 2 is a geometric diagram of the light arrangement of the camera of FIG. 1 for in-the-air photography.
Figure 3:
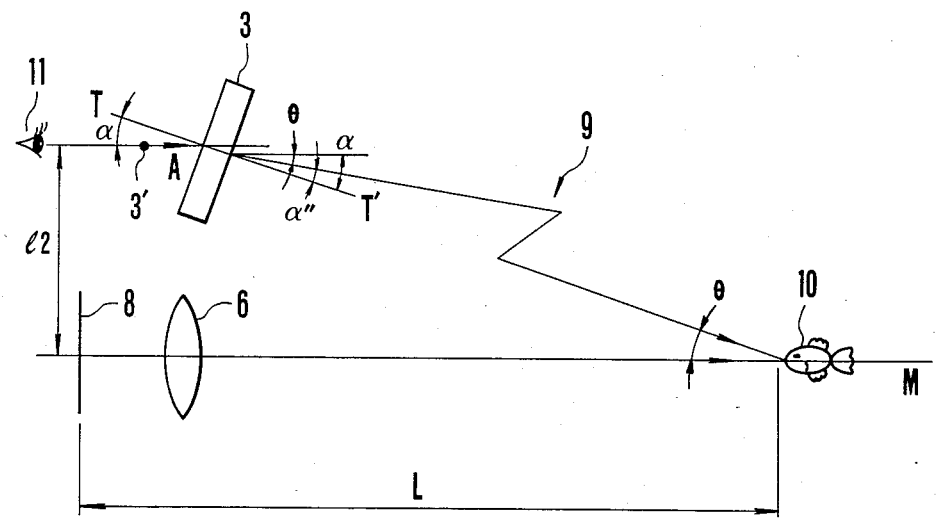
FIG. 3 is a geometric diagram of the light arrangement of the FIG. 1 camera in use under water.

The present invention will next be described in connection with a first embodiment thereof by reference to FIGS. 1 to 4. In FIG. 1, a camera body 1 is equipped with a release button 2, a transparent plate 3 for protecting an objective lens of a finder, a protector 4 for a strobe, a lens barrel 5, a photographic objective 6 and a photosensitive element 7 on the lens barrel 5. In FIGS. 2 and 3, film 8 is contained within the camera body 1. An object 10 to be photographed lies under the surface of water 9. Element 11 is the photographer's eye looking through the finder. The aforesaid finder is inclined by an angle, $\alpha$, to the optical axis of the photographic objective 6. Now let us denote the center of the area of the front surface of the photographic objective 6 by O, the center of the area of the front surface of the finder by P, the distance between the centers O and P by l, the horizontal distance between the centers O and P by l1 and the vertical distance between the centers O and P by l2.

When such a camera is used for in-the-air photography, as shown in FIG. 2, a central ray A parallel to the optical axis of the photographic lens 6 is incident on the finder protection glass plate 3, at a central point 3' thereof, at an angle, $\alpha$, to the incidence-normal T. At the first surface of the glass plate 3, therefore, the ray is refracted. The refracted ray is refracted again at the second surface at an angle $\alpha$ to the incidence-normal T'. However, the emerging ray is shifted from the incident ray by a distance, $\Delta l$, in the direction perpendicular to the direction of the ray, as shown in FIG. 2, advancing parallel to the optical axis of the photographic lens. This shift, $\Delta l$, dependent on the thickness and refractive index of the glass plate 3, is very small in value. Therefore, inclination of the protection glass plate 3 on the front panel of the camera housing does not adversely affect in-the-air photography.

Application to underwater photography is described with reference to FIG. 3. Tracing the optical path of the eye from the central point 3' of the finder, its central ray lies in an optical path shown by arrow A and is incident on the glass plate 3 at an angle, $\alpha$, to the normal line T. Similarly to FIG. 2, the incident ray is refracted and travels through the glass plate 3. At the second surface, however, because the atmosphere is not air but water, the ray exits at a smaller angle, $\alpha''$, than the angle of incidence, $\alpha$, and intersects the optical axis M of the photographic lens at an angle of $(\alpha - \alpha'')$.

Figure 4:
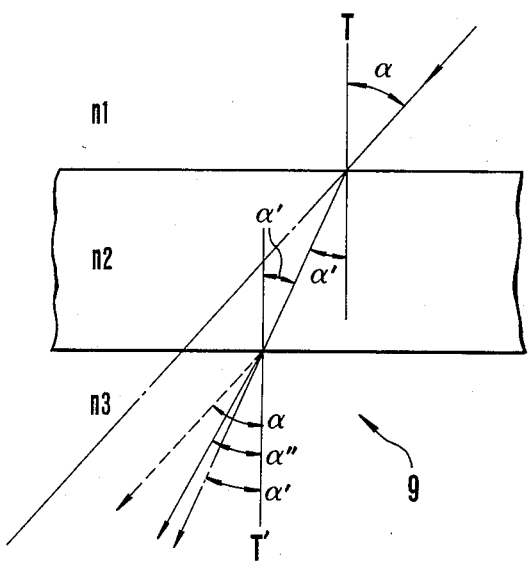
FIG. 4 illustrates the details of refraction of a ray passing through the glass plate of FIG. 3 to different media.

When light enters a medium of different refractive index, the light is refracted according to the formula shown below:

$$n \sin \alpha = n' \sin \alpha'$$

where "n" is the refractive index and $\alpha$ is the angle of incidence. This is shown in FIG. 4. From this $$n1 \sin \alpha = n2 \sin \alpha' \quad (1)$$

$$n2 \sin \alpha' = n3 \sin \alpha'' \quad (2)$$

From equations (1) and (2), $$n1 \sin \alpha = n3 \sin \alpha'' \quad (3)$$

Therefore, or ray A arriving at the angle $\alpha$ to the incidence-normal T in FIG. 4, the refracted ray travels at an angle $\alpha'$ to the incidence-normal T according to the formula (1).

Refracted ray A' advances through the medium of refractive index n2 and emerges to another medium of refractive index n3 at an angle $\alpha''$ to the normal line T'. If the value of the refractive index n3 is equal to that of the refractive index of air, the emerging ray becomes parallel to the incident ray as shown by the dashed line. If the value of n3 is the same as n2, the optical path is straight and the angle $\alpha'$ remains unchanged.

FIG. 4 illustrates a case where the refractive indices are n1<n3<n2,

Turning to FIG. 3 again, the glass plate 3 is inclined so that the incident ray arrives at an angle $\alpha$ to the incidence-normal T. Therefore, when the camera is under water, the ray exits at the angle $\alpha''$ to the normal line T'. Therefore, the formula (3), for the known values of n1 and n3 (n1=1 for air, n3—1.33 for water), because the distance l2 from the lens center O of the camera to the finder center P is constant, the angle $\alpha''$ can be evaluated as a function of the object distance at which the exiting ray intersects the optical axis M. Therefore, the angle of inclination of the glass plate 3 can be determined.

First, n1=1 (Refractive index of air)
n3=1.33 (Refractive index of water)
l2=50 mm (Average of different cameras)
L=1500 mm (At which the object 10 under water is shot most frequently)

$$\tan(\alpha - \alpha'') = \frac{l2}{L} \quad (4)$$

$$= \frac{50}{1500}$$

$$\therefore \alpha - \alpha'' \approx 1.91°$$

$$\therefore \alpha'' = \alpha - 1.91°$$

By substituting this result into formula (3), we obtain $$n1 \sin \alpha = n3 \sin (\alpha - 1.91°)$$

$$\tan \alpha = \frac{\sin 1.91°}{\cos 1.91 - \frac{n1}{n3}} \quad n1 = 1, n3 = 1.33$$

$$\approx 0.1347$$

$$\alpha \approx 7.7°$$

Thus, the angle of inclination of the glass plate in the vertical direction is found to be about 8°. This makes it possible for the finder center P to see an object point at about 1 meter on the optical axis of the photographic lens when taking shots under water. This inclination may otherwise be made in the horizontal direction or preferably in both the vertical and horizontal directions.

As has been described above, according to the present invention, the protection glass plate 3 of the finder is inclined toward the optical axis of the photographic lens by an angle expressed as:

$$\tan \alpha = \frac{\sin \theta}{\cos \theta - \frac{n1}{n3}}, \text{ wherein } \theta = \alpha - \alpha''.$$

This makes it possible, without causing any interference during in-the-air photography, to point the optical axis of the finder at a shorter object distance. Therefore, it is insured that an object, the image of which is formed at the center of the viewfield, can be located at the center of the area of the picture format.

A second embodiment of the present invention is described with reference to FIGS. 5 to 8.

Figure 5:
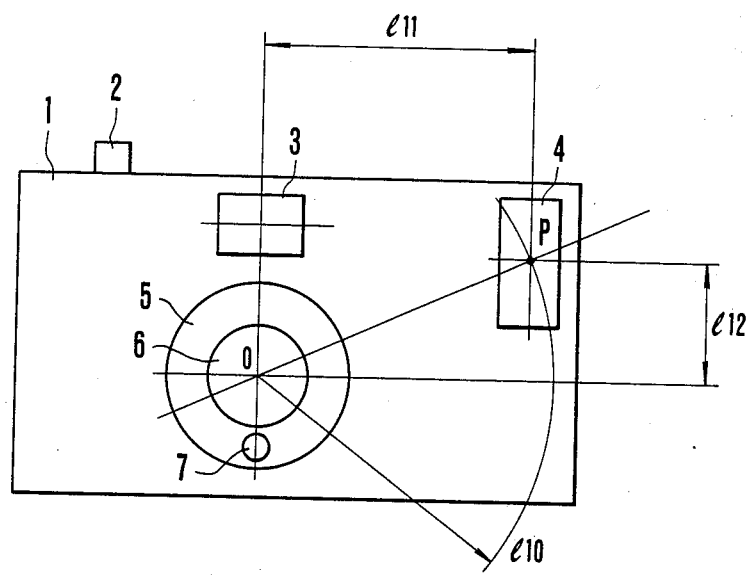
FIG. 5 is a front elevational view of a second embodiment of the watertight camera according to the present invention.

FIG. 5 illustrates another camera viewed from the front, where the same reference characters have been employed to denote similar parts to those shown in FIG. 1. In FIG. 5, the distance between the lens center O and a strobe center P is denoted by 110 and its X- and Y-directional components 111 and 112, respectively.

Figure 6:
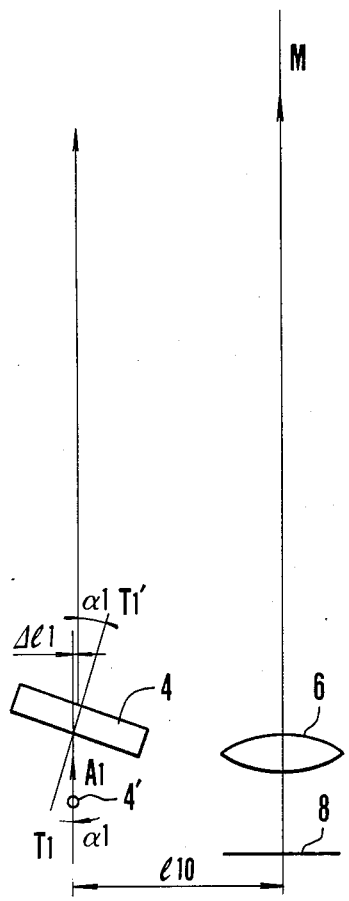
FIGS. 6 and 7 are geometric diagrams of the light arrangements of the camera of FIG. 5 used in the air and under water respectively.
Figure 7:
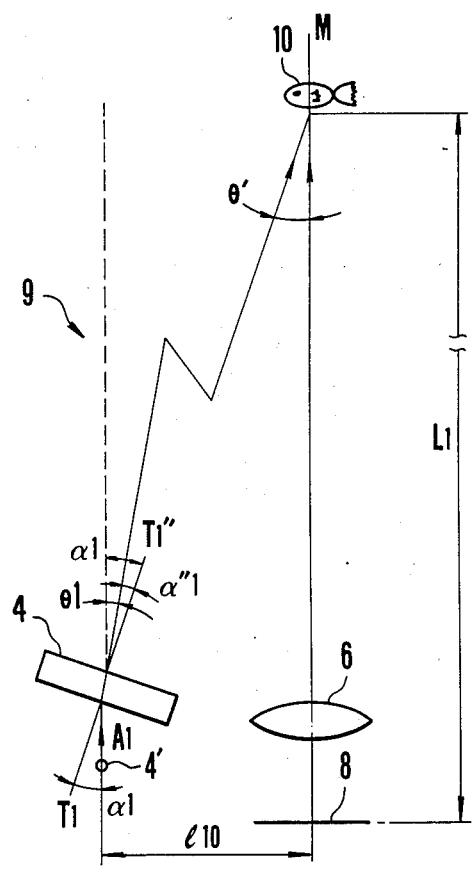

FIGS. 6 and 7 show the relation of the photographic lens 6 and the protector 4 for the strobe. The normal line of the protector 4 intersects the line of the optical axis of the photographic lens 6 at an angle $\alpha 1$. FIG. 6 shows a photographing state in-the-air. FIG. 7 shows a photographing state under water.

The central ray 4' from the center of the luminous area of the strobe travels in an optical path shown by arrow A1 and is incident on the protector 4 at an angle $\alpha 1$ to the incidence-normal T1. Ray A' is refracted in accordance with the refractive index of protector 4 and advances. For the in-the-air photographing state, the refracted ray exits from protector 4, and enters air. Therefore, the refractive index again becomes air, so that the ray exits after refraction at the angle $\alpha 1$ to the normal line T1'.

At this time, the exiting optical path is shifted by $\Delta l1$ as shown in FIG. 6, advancing toward an object to be photographed in parallel with the incident ray. This shift $\Delta l1$ is dependent on the thickness of the protector 4, but is very small in value.

Accordingly, inclination of the protector 4 from the front panel has no adverse effect on in-the-air photography.

The central ray issuing from the central point 4' of the strobe in the optical path shown by arrow A1 is incident on the first surface of the protector 4 at the angle $\alpha 1$ with the normal line T1 and, after having been refracted at this surface, travels through the protector 4. In underwater photography, however, when the ray exits from the protector, because the outside is not air but water, the ray advances, according to the refractive index of the water, at an angle $\alpha 1''$ to the normal line $T1''$, as shown in FIG. 7, or an angle of inclination $(\alpha 1 - \alpha 1'')$ with the parallel light and pointing to the photographic optical axis M.

Figure 8:
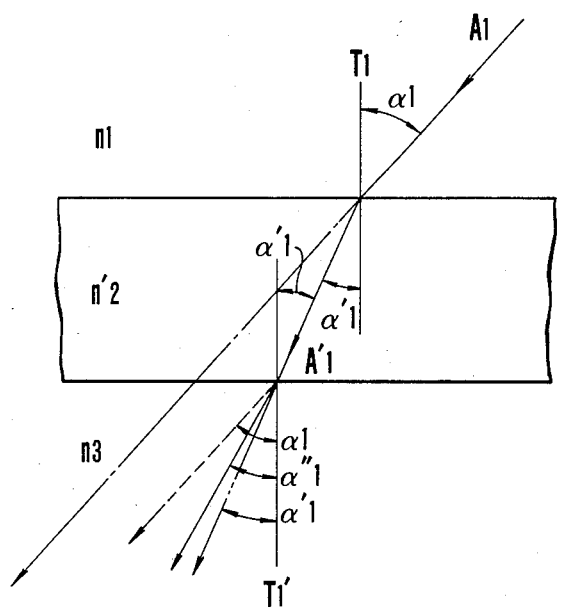
FIG. 8 illustrates the details of refraction of a ray passing through the protector of FIG. 7 to different media.

FIG. 8 illustrates a slightly more detailed explanation of this optical axis.

In FIG. 8, n1, n2' and n3 are the refractive indice of air, protector and water, respectively.

When light enters a medium of different refractive index, the light is refracted according to the formula shown below:

$$n \sin \alpha = n' \sin \alpha'$$

where "n" is the refractive index and $\alpha$ is the angle of in incidence. Hence, $$n1 \sin \alpha 1 = n2' \sin \alpha 1' \quad (1)$$

$$n2' \sin \alpha 1' = n3 \sin \alpha 1'' \quad (2)$$

From the formulas (1) and (2).

$$n1 \sin \alpha 1 = n3 \sin \alpha 1'' \quad (3)$$

In FIG. 8, the incident ray A1 is incident at an angle $\alpha 1$ to the normal line T1. Therefore the incident ray is refracted at an angle $\alpha 1'$ according to formula (1).

The ray of light $A1'$, advancing through the material of refractive index n2', upon incidence with a material of another refractive index n3, is refracted at an angle $\alpha 1''$ to the normal line $T1'$ according to formula (2).

If the refractive index n3 of the material is the same as that of the air, or "n", the light ray is refracted at an angle $\alpha 1$ as shown by the dashed line, advancing in parallel with the optical path in the air (a dot-and-dash line). If n3 is the same as n2', the ray is not refracted and the angle remains unchanged from $\alpha 1'$.

FIG. 8 illustrates a case where n1<n3<n2'. Returning to FIG. 7, the protector 4 is inclined so that the arriving ray A1 is incident on it at an angle $\alpha 1$ to the normal line T1. Therefore, because the outside is in water, the ray exits at an angle $\alpha 1''$ in the normal line $T'1$.

Since n1 and n3 have known values, and because l10 is the distance between the lens center and the strobe center, $\alpha 1''$ can be evaluated using formula (3) when the distance to the object to be photographed is given. Therefore the angle $\alpha 1$ of the protector 4 can be computed.

Here, L1 is the distance from the film plane 8 to the object 10 to be photographed. Therefore, at first, $\alpha 1''$ is found as follows $$\tan (\alpha 1 - \alpha 1'') = l10/L1 \quad (4)$$

l10/L1 turns out, from the trigonometrical function table, to be $\theta 1$:

$$\alpha 1 - \alpha 1'' = \theta 1 \quad (5)$$

$$\alpha 1'' = \alpha 1 - \theta 1$$

By substituting formula (5) into formula (3), $$n1 \sin \alpha 1 = n3 \sin (\alpha 1 - \theta 1)$$

$$n1 \sin \alpha 1 = n3 (\sin \alpha 1 \cos \theta 1 = \cos \alpha 1 \sin \theta 1)$$

$$(n1/n3) \tan \alpha 1 = \tan \alpha 1 \cos \theta 1 - \sin \theta 1$$

$$\tan \alpha 1 = \frac{\sin \theta 1}{\cos \theta 1 - \frac{n1}{n3}} \quad (6)$$

Thus, the inclination of the protector 4 of the strobe can be computed.

First,
n1 = 1 (Refractive index of air)
n3 ≈ 1.33 (Refractive index of water)
l10 ≈ 65 mm (Average distance in ordinary cameras without producing a red eye)
L1 = 1500 mm (Central numerical value of the highest frequency of use under water)

Here, L1 is a numerical value from the film plane 8 to the object 10, as has been stated above, of the deviation from the center of the strobe. But in comparison with 1500 mm, it is a very small value, so that computation is made using 1500.

$$\tan \theta 1 = 65/1500$$

$$\theta 1 = 2.5°$$

By substituting this into equation (6), $$\tan \alpha 1 = \frac{\sin 2.5°}{\cos 2.5° - \frac{1}{1.33}}$$

$$= 0.1765$$

$$\alpha 1 = 10°$$

Thus, when the protector 4 is inclined by about 10°, the center of the bundle of light rays of the strobe strikes at about 1.5 meters on the optical axis of the photographic lens.

Also in this case, where the protector is inclined toward the optical axis of the lens, because this increases the complexity, the inclination may be made in only one of the vertical and horizontal directions, depending on which is a longer distance, l11 or l12, to achieve a considerable improvement of the light distribution characteristic.

As has been described above, according to the present invention, the front protector of the strobe is inclined toward the photographic optical axis at an angle $\alpha$ expressed as:

$$\tan \alpha 1 = \frac{\sin \theta 1}{\cos \theta 1 - \frac{n1}{n3}}$$

It is thus possible to change the light distribution characteristic to emphasize an object at a shorter distance under water, without causing any adverse effects during in-the-air photography.

What is claimed is:
1. A watertight camera comprising:
   (a) a photographic lens; and
   (b) a finder having an objective protection transparent plate, said objective protection transparent plate being inclined with the normal line thereof to the axial direction of said photographic lens, wherein the angle of inclination α of the transparent plate satisfies the following formula:

$$\tan\alpha = \frac{\sin\theta}{\cos\theta - \frac{n1}{n3}}$$

where n1 is the refractive index of air; n3 is the refractive index of water, and θ is the angle whose tangent equals l/L, wherein l is the distance from the center of said photographic lens to the center of said transparent plate, and L is the distance from the film plane to an object to be photographed.

2. A camera according to claim 1, wherein the angle of inclination of said transparent plate is about 8 degrees.

3. A watertight camera comprising:
   (a) a photographic lens; and
   (b) a strobe having a protector, said protector being inclined with its normal line to the axial direction of said photographic lens, wherein the angle of inclination α of the protector satisfies the following formula:

$$\tan\alpha = \frac{\sin\theta}{\cos\theta - \frac{n1}{n3}}$$

wherein n1 is the refractive index of air; n3 is the refractive index of water; and θ is the angle whose tangent equals l/L, where l is the distance from the center of said photographic lens to the center of said protector and L is the distance from the film plane to an object to be photographed.

4. A camera according to claim 3, wherein the angle of inclination of said protector is about 10 degrees.

5. A watertight camera comprising:
   a camera body;
   a lens mounted on the camera body defining an optical axis;
   an optical device mounted to the camera body;
   said optical device having a transparent protection plate for preventing entry of water into the camera body;
   said protection plate having a line normal to the plate inclined relative to the optical axis;
   the angle of inclination of the normal line relative to the optical axis being such as to pass light through the plate parallel to the optical axis when light travels to and from the camera body through air and to refract light between a direction parallel to the optical axis within the camera body and a direction parallel to a line intersecting the optical axis outside the body when the camera is used in water.

6. A camera as in claim 5, wherein said optical device is a finder.

7. A camera as in claim 5, wherein said optical device is a strobe.

* * * * *